United States Patent [19]

Humphrey

[11] 4,275,899

[45] Jun. 30, 1981

[54] HINGED BI-LEVEL HITCH FOR A VEHICLE

[76] Inventor: Verle L. Humphrey, Elkhart, Kans. 67950

[21] Appl. No.: 67,323

[22] Filed: Aug. 17, 1979

[51] Int. Cl.³ ............................................... B60D 1/06
[52] U.S. Cl. ................................ 280/491 B; 280/497; 280/500
[58] Field of Search .......... 280/497, 500, 495, 491 R, 280/491 B, 498, 490 R, 461 R; 248/282, 284, 289 R, 291

[56] References Cited

U.S. PATENT DOCUMENTS

| | | | |
|---|---|---|---|
| 2,604,331 | 7/1952 | Kingston | 280/491 B |
| 2,812,956 | 11/1957 | Edinger | 280/415 A X |
| 2,889,155 | 6/1959 | Sandage | 280/491 B |
| 3,177,008 | 4/1965 | Steele | 280/490 R X |
| 3,471,070 | 10/1969 | Olson | 280/505 X |
| 3,640,550 | 2/1972 | Pearson | 280/491 B |
| 3,717,362 | 2/1973 | Johnson | 280/500 X |
| 3,751,072 | 8/1973 | Williams | 280/491 B |
| 3,801,134 | 4/1974 | Dees | 280/415 A |
| 3,806,161 | 4/1974 | Pollart et al. | 280/500 |
| 3,922,006 | 11/1975 | Borges | 280/415 A |

*Primary Examiner*—John J. Love
*Assistant Examiner*—Randall A. Schrecengost
*Attorney, Agent, or Firm*—Edwin H. Crabtree

[57] ABSTRACT

A heavy duty hinged bi-level hitch for mounting on a tubular bumper of a vehicle. The bi-level hitch includes an upper hitch assembly with an upper hitch ball. The upper hitch assembly is integrally formed in the center of the bumper. A lower hitch assembly is pivotally attached to the bottom of the bumper. By loosening a pair of bolts, the lower hitch assembly can be pivoted from a raised storage position underneath the vehicle to a lowered position directly below the upper hitch assembly. The bi-level hitch eliminates the need of lowering or modifying the bumper of a high axle vehicle and provides a low pull point for the vehicle.

3 Claims, 7 Drawing Figures

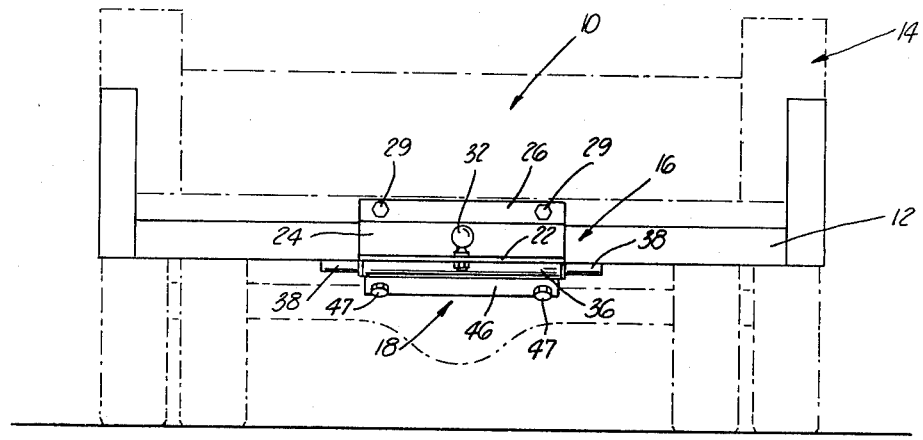
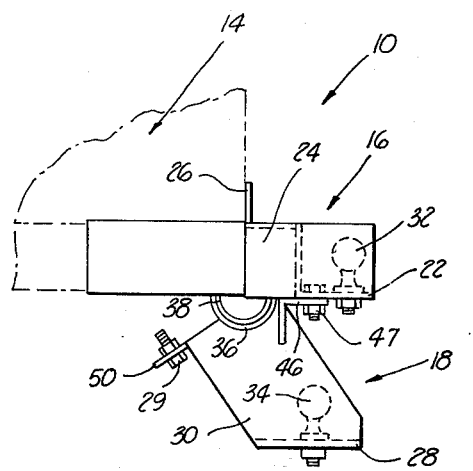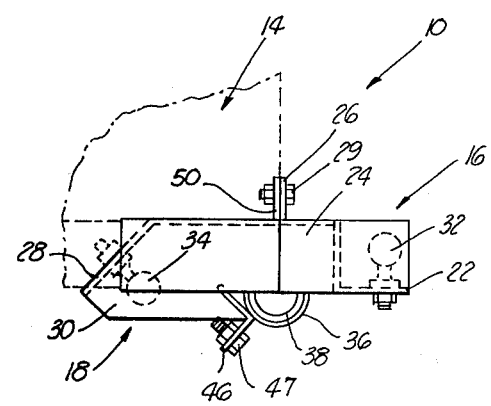
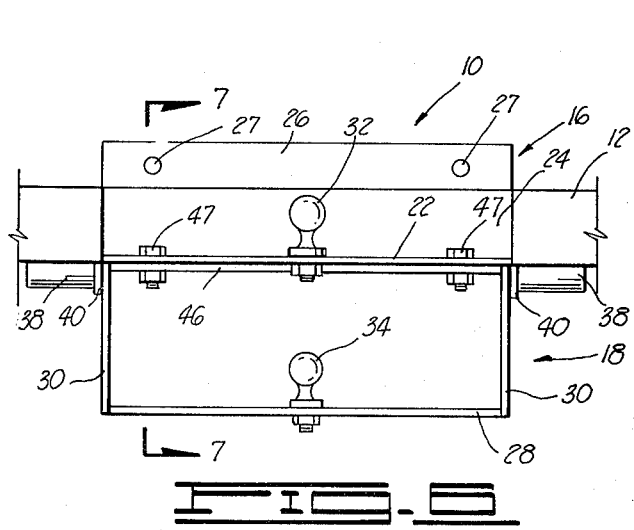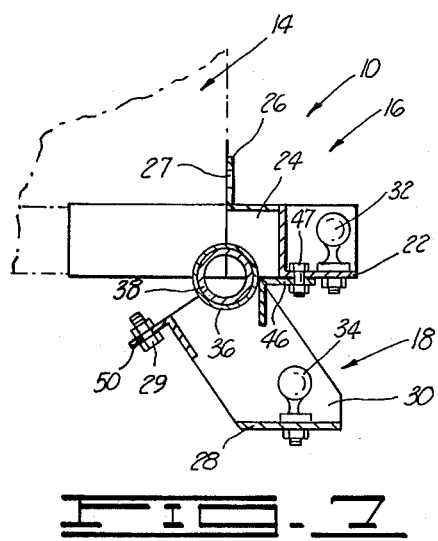

HINGED BI-LEVEL HITCH FOR A VEHICLE

BACKGROUND OF THE INVENTION

This invention relates to a vehicle hitch for pulling a trailer or the like and more particularly, but not by way of limitation, to a bi-level hitch which is readily adaptable to a tubular vehicle bumper.

Heretofore there have been various types of adjustable trailer hitches such as the hitches shown in U.S. Pat. No. 3,717,362 to Johnson, U.S. Pat. No. 3,922,006 to Borges, and U.S. Pat. No. 2,812,956 to Edinger. Also, different types of trailer hitch adapters are shown in U.S. Pat. No. 3,806,161 to Pollart, et al, U.S. Pat. No. 3,640,550 to Pearson, and U.S. Pat. No. 3,801,134 to Dees. More particularly, a retractable trailer hitch is shown in U.S. Pat. No. 2,889,155 to Sandage. In this patent a trailer hitch is shown in a raised position adjacent the rear of an automobile bumber and in a retracted position underneath the vehicle. None of the prior art patents specifically disclose a hinged bi-level hitch for high axle vehicles which is attached to a heavy duty tubular bumber which gives the operator a choice of using an upper hitch assembly or a lower hitch assembly.

SUMMARY OF THE INVENTION

The subject invention provides a hinged bi-level hitch for a vehicle thereby eliminating the need of modifying vehicle bumpers that are too high from the ground surface due to high axles used in vehicles such as four-wheel drives, heavy duty trucks and the like.

The bi-level hitch provides an upper hitch assembly with an upper hitch ball and a lower hitch assembly with a lower hitch ball so that the operator of the vehicle has a choice of hitch balls depending on the type of equipment to be pulled.

The lower hitch assembly can be quickly released by removing a pair of bolts so that the lower hitch assembly can be raised underneath the vehicle and attached thereto to prevent the lower hitch assembly from dragging on irregular ground terrain.

The lower hitch assembly with lower hitch ball provides high axle vehicles with a low pull point when pulling trailer equipment which ordinarily could not be pulled due to the increased height of the bumper above the ground surface.

The hitch is simple in design, rugged in construction, and can be readily adapted to heavy duty tubular bumpers used on automotive equipment, trucks, farm equipment and the like.

The hinged bi-level hitch for a vehicle includes an upper hitch assembly integrally formed and centered on a tubular bumper. A lower hitch assembly is pivotally attached to the bumper and in a lowered position is disposed directly below the upper hitch assembly. The lower hitch assembly is attached to the upper hitch assembly by a first mounting bracket having a pair of apertures for receiving bolts therethrough and securing the lower hitch assembly to the upper hitch assembly. By releasing the bolts the lower hitch assembly may be pivoted underneath the vehicle and secured to the rear of the upper hitch assembly by a pair of bolts received through apertures in a second mounting bracket.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 3 is a rear view of the bi-level hitch with the lower hitch assembly in a a raised storage position.

FIG. 4 is a side view of the bi-level hitch with the lower hitch assembly in a raised storage position underneath the vehicle.

FIG. 5 is a side view of the bi-level hitch with the lower hitch assembly in a lowered position and secured to the upper hitch assembly.

FIG. 6 is a front view of the bi-level hitch with the lower hitch assembly in a lowered position underneath the upper hitch assembly.

FIG. 7 is a side sectional view taken along lines 7—7 shown in FIG. 6.

DETAILED DESCRIPTION OF THE DRAWINGS

Figure 1:
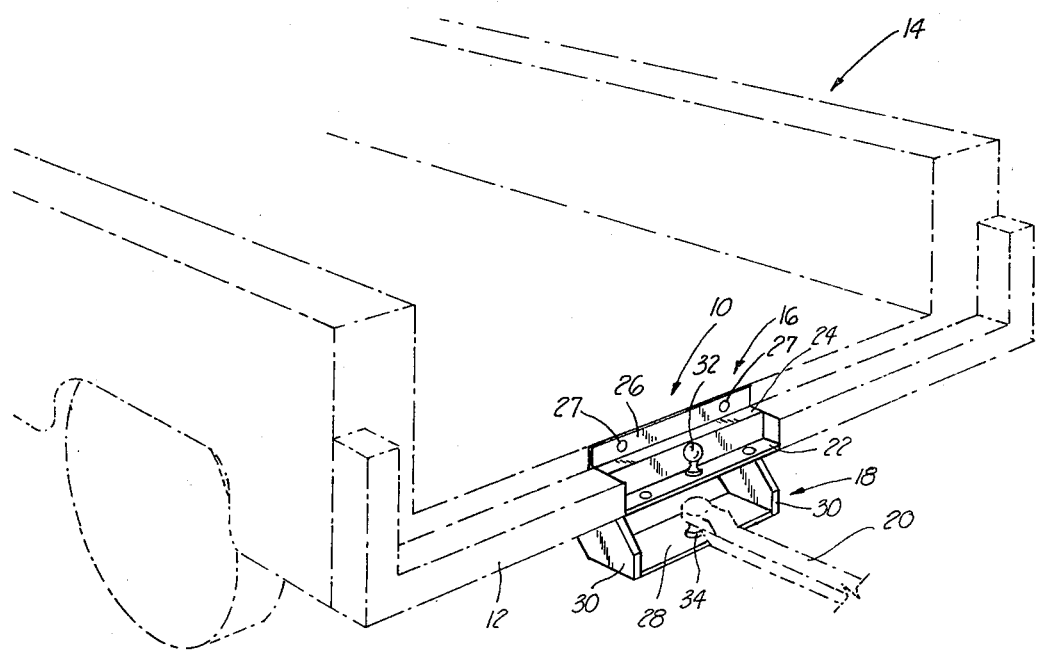
In FIG. 1 a perspective view of the bi-level hitch is shown attached to a tubular bumper on the rear of a vehicle.

In FIG. 1, a perspective view of the heavy duty hinged bi-level hitch is shown and designated by general reference numeral 10. The hitch 10 is shown attached to a tubular bumper 12 attached to the rear of a vehicle 14.

The hitch 10 includes an upper hitch assembly 16 integrally formed in the center of the bumper 12 and a lower hitch assembly 18 shown in a lowered position directly below the upper hitch assembly 16. A portion of a towbar 20 shown in dotted lines is seen attached to the lower hitch assembly 18.

The upper hitch assembly 16 includes a horizontal upper hitch plate 22 attached to and centered on the bottom of the bumper 12. A pivot shaft housing 24 is centered on and integrally formed in the rear of the bumper 12. A vertical flat shield 26 is attached to the top of the bumper 12 and the pivot shaft housing 24 and includes apertures 27 for receiving a pair of bolts 29 shown in FIGS. 3 and 4.

The lower hitch assembly 18 includes a lower hitch plate 28 and side plates 30 attached to the ends of the lower hitch plate 28.

The upper hitch assembly 16 is adapted for receiving an upper hitch ball 32 and the lower hitch assembly 18 is adapted for receiving a lower hitch ball 34. In FIG. 1 it is desired to have a low pull point for towing a trailer or the like, therefore the two bar 20 is attached to the lower hitch ball 34 which in turn is attached to the lower hitch assembly 18.

Figure 2:
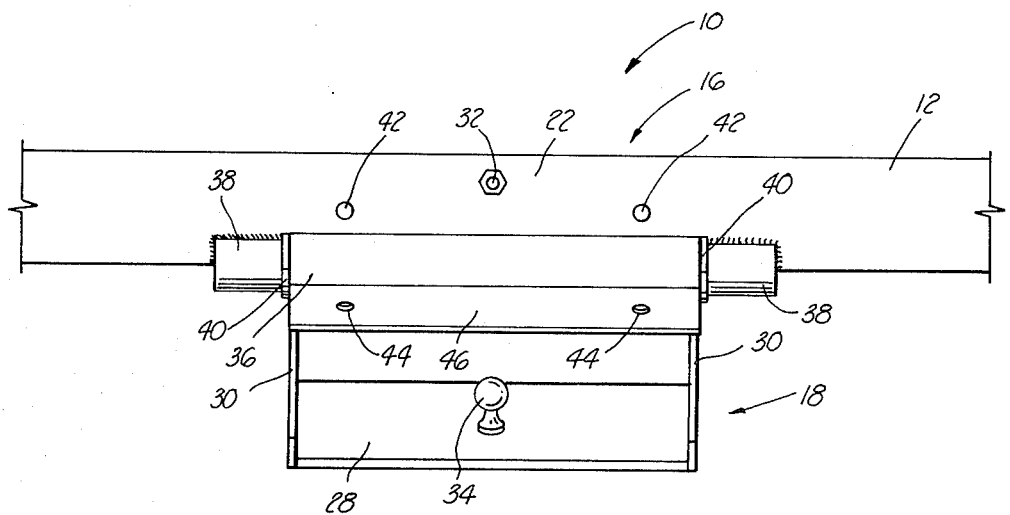
FIG. 2 is a bottom view of the bi-level hitch with the lower hitch assembly in a raised storage position underneath the vehicle.

In FIG. 2 a bottom view of the upper hitch assembly 16 is shown with the lower hitch assembly 18 in a raised position underneath the vehicle 14. The lower hitch assembly 18 is pivotally attached to the rear of the bumper 12 by a pivot collar 36 which is attached to the side plates 30 and receives a pivot shaft 38 therein. The ends of the pivot shaft 38 extend outwardly from the pivot collar 36 and are welded to the rear of the bumper 12. The pivot collar 36 is prevented from sliding lengthwise along the shaft 38 by shaft washers 40 welded to the sides of the shaft 38 and adjacent the ends of the pivot collar 36.

In this view, the bottom of the upper hitch plate 22 can be seen having a pair of apertures 42 therein. The apertures 42 are indexed with a pair of apertures 44 in a first mounting bracket 46 for receiving a pair of bolts 47 when the lower hitch assembly 18 is in a lowered position. The bolts 47 are shown in FIGS. 3, 4 and 5. The first mounting bracket 46 is attached to the front of the side plates 30.

In FIGS. 3 and 4, the lower hitch assembly 18 can be seen pivoted on pivot shaft 38 into a raised position underneath the vehicle. The lower hitch assembly 18 is secured in a raised position by a second mounting bracket 50 having a pair of apertures which are not shown and are indexed with apertures 37 in the vertical flat shield 26. When the assembly 18 is in a raised position, the second mounting bracket 50 is tangent and parallel with the shield 26. The bolts 29 are received through the apertures thereby securing the lower hitch assembly 18 in a raised position so that the lower assembly 18 does not drag or high-center the vehicle 14 on irregular ground surface during off-highway use.

The lower hitch assembly 18 can be quickly released by removing the bolts 29 and allowing the lower plate 28 and side plates 32 to be pivoted downwardly on the pivot collar 36.

In FIG. 5 a side view of the lower assembly 18 is shown in a lowered position. In this position, the first mounting bracket 46 is parallel to and tangent with the upper hitch plate 22. At this time, the bolts 47 are received through the apertures for securing the lower hitch assembly 18 directly below the upper hitch assembly 16. It should be noted when the lower hitch assembly 18 is in a lowered position, the bolts 29 can be stored in the second mounting bracket 50 until it is desired to raise the lower hitch assembly 18 and again use the bolts 29 for securing the assembly 18 in a raised position.

In FIG. 6 a front view of the upper hitch assembly 16 and the lower hitch assembly 18 in a lowered position can be seen. In this view the lower hitch ball 34 is disposed directly below the upper hitch ball 32 with the lower hitch assembly 18 secured to the upper hitch plate 22 by the bolts 47. When the lower hitch assembly 18 is pivoted on the pivot shaft 38 into a raised position, as shown in FIGS. 3 and 4, the bolts 47 can be stored on the first mounting bracket 46 as shown.

In FIG. 7 a side sectional view of the hitch 10 is shown taken along lines 7—7 shown in FIG. 6. In this view, the lower hitch assembly 18 is in a lowered position with the first mounting bracket 46 secured to the bottom of the upper hitch plate 22 by the bolts 47. Also seen in this view if the pivot shaft 38 extending through the pivot collar 36 which is secured to the side plates 30 and a portion of the first mounting bracket 46. The pivot collar 36 and pivot shaft 38 can be seen housed in a portion of the pivot shaft housing 24.

When it is desired to pivot the lower assembly 18 into a raised position underneath the vehicle 14, the bolts 47 are quickly removed from the upper mounting plate 22 and the first mounting bracket 46. The lower assembly 18 is then pivoted in a clockwise direction on the pivot shaft 38. During this time the bolts 29 are removed from the second mounting bracket 50 and are inserted through apertures 27 in the shield 26 and through the apertures in the second mounting bracket 50 for securing the lower assembly 18 in a raised position underneath the vehicle 14 and at the rear of the upper hitch assembly 16.

Changes may be made in the construction and arrangement of the parts or elements of the embodiments as described herein without departing from the spirit or scope of the invention defined in the following claims:

What is claimed is:

1. A hinged bi-level hitch for a vehicle, the hitch adapted for receipt on a tubular bumper of the vehicle, the hitch comprising:
    an upper hitch assembly integrally formed in the tubular bumper of the vehicle, the upper hitch assembly including:
        a horizontal upper hitch plate having apertures therein and attached to and centered on the bottom of the bumper;
        a pivot shaft housing centered on and integrally formed in the rear of the bumper; and
        a vertical flat shield having apertures therein and attached to the top of the bumper and the pivot shaft housing;
    a lower hitch assembly including:
        a lower hitch plate; and
        side plates attached to the ends of the lower hitch plate;
    a pivot collar attached to the side plates;
    a pivot shaft extending through the pivot collar, the ends of the pivot shaft attached to the bottom of the bumper, a portion of the pivot collar and pivot shaft received in the pivot shaft housing;
    a first mounting bracket having apertures therein, the ends of the first mounting bracket attached to the front of the side plates, the first mounting bracket tangent with the bottom of the upper hitch plate when the lower hitch assembly is in a lowered position underneath the upper hitch plate, the apertures of the first mounting bracket indexed with the apertures in the upper hitch plate for receiving bolts therethrough and securing the lower hitch assembly below the upper hitch plate; and
    a second mounting bracket having apertures therein and attached to the rear of the side plates, the second mounting bracket tangent with the vertical flat shield when the lower hitch assembly is in a raised position underneath the vehicle, the apertures of the second mounting bracket indexed with the apertures in the vertical flat shield for receiving bolts therethrough and securing the lower hitch assembly in a raised position underneath the vehicle.

2. The hitch as described in claim 1 further including an upper hitch ball attached to the upper hitch plate.

3. The hitch as described in claim 1 further including a lower hitch ball attached to the lower hitch plate.

* * * * *